United States Patent
Lin et al.

(10) Patent No.: US 8,803,851 B2
(45) Date of Patent: Aug. 12, 2014

(54) STYLUS PEN

(71) Applicant: Cheng Uei Precision Industry Co., Ltd., New Taipei (TW)

(72) Inventors: Wen Ko Lin, New Taipei (TW); Ting Kang Wong, New Taipei (TW); Ya Fen Yao, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 119 days.

(21) Appl. No.: 13/726,418

(22) Filed: Dec. 24, 2012

(65) Prior Publication Data
US 2014/0176511 A1    Jun. 26, 2014

(51) Int. Cl.
  G06F 3/033    (2013.01)
  G06F 3/0354   (2013.01)
  B43K 5/16     (2006.01)
  B43K 1/10     (2006.01)

(52) U.S. Cl.
  CPC ................................. G06F 3/03545 (2013.01)
  USPC .............. 345/179; 345/184; 401/99; 401/258

(58) Field of Classification Search
  CPC .................................................. G06F 3/03545
  USPC .............................. 345/179–184; 401/58–260
  See application file for complete search history.

(56) References Cited

U.S. PATENT DOCUMENTS

| 7,955,017 | B2 * | 6/2011  | Lapstun et al. ............... 401/195 |
| 7,982,896 | B2 * | 7/2011  | Lapstun et al. ............... 358/1.15 |
| 8,040,320 | B2 * | 10/2011 | Shemesh et al. .............. 345/158 |
| 2006/0227121 | A1 * | 10/2006 | Oliver ........................ 345/179 |
| 2010/0020195 | A1 * | 1/2010 | Silverbrook et al. ....... 348/231.1 |
| 2013/0201162 | A1 * | 8/2013 | Cavilia ........................ 345/179 |

* cited by examiner

*Primary Examiner* — Joe H Cheng
*Assistant Examiner* — Michael J Jansen, II
(74) *Attorney, Agent, or Firm* — WPAT, P.C.; Anthony King

(57) ABSTRACT

A stylus pen includes a pen body, an electromagnetic touch pen module which includes an electromagnetic pen head disposed in a top end of the pen body and a first circuit board connecting with the electromagnetic pen head, a camera module which includes a second circuit board, a camera lens embedded in a cavity of the top end of the pen body and a power button, a rechargeable battery pack disposed in the pen body to supply power for the electromagnetic touch pen module and the camera module, and a function button connected to the first and the second circuit boards to act as a right mouse button and a shutter button. The stylus pen switches working modes between the camera module and the electromagnetic touch pen module through powering on and off the power button.

9 Claims, 3 Drawing Sheets

STYLUS PEN

BACKGROUND OF THE INVENTION

1. Field of the Invention

The present invention generally relates to a stylus pen, and more particularly to a stylus pen with multiple functions.

2. The Related Art

In order to facilitate users, electronic devices are required to have smaller size and lighter weight, particularly to portable electronic devices, such as mobile phones, pocket personal computers and personal digital assistants etc. With the miniaturization of the electronic device, the area where controlling keys of the electronic device are located is reduced, and accordingly, the amount and the size of the controlling keys are reduced, so that brings inconvenience for the users. In order to solve the inconvenience, the electronic device is designed with a touch screen, and accordingly, a stylus pen acting on the touch screen came with the tide of fashion. However, at present, most of the stylus pens only have the basic touch pen function acting on the touch screen, or only have two simple pen functions, such as traditional ballpoint pen and basic touch pen function. That cause an extremely limited use for the users and the stylus pen has a poor practicality.

SUMMARY OF THE INVENTION

An object of the present invention is to provide a stylus pen which includes a hollow pen body, an electromagnetic touch pen module, a camera module, a rechargeable battery pack and a function button.

A top end of the pen body is concaved downward to form a cavity. A top of the cavity is covered with a cover glass. The electromagnetic touch pen module includes an electromagnetic pen head which is disposed in the top end of the pen body, and a first circuit board which is mounted to an inner sidewall of the pen body. The first circuit board electrically connects with the electromagnetic pen head for controlling the electromagnetic pen head to output corresponding electromagnetic signals.

The camera module includes a second circuit board, a camera lens embedded in a bottom wall of the cavity of the pen body, a USB connector disposed in a bottom end of the pen body, and a power button embedded in a lower position of an outer sidewall of the pen body. The second circuit board is mounted in the pen body and electrically connects with the camera lens, the USB connector and the power button. The power button controls work states of the camera module. Images taken by the camera module are capable of being transmitted out by virtue of the USB connector.

The rechargeable battery pack is disposed in the pen body and connected with both the first circuit board and the second circuit board to supply power for the electromagnetic touch pen module and the camera module. The rechargeable battery pack is capable of being charged via the USB connector. The function button is embedded in an upper position of the outer sidewall of the pen body and electrically connected to the first circuit board and the second circuit board.

In use, through powering on and off the power button, the stylus pen switches working modes between the camera module and the electromagnetic touch pen module. Accordingly, when the stylus pen works by the camera module, the function button is acted as a shutter button; when the stylus pen works by the electromagnetic touch pen module, the function button is acted as a right mouse button.

As described above, the stylus pen of the present invention utilizes the foregoing components and the interrelation thereof to realize multiple functions, so that improves the practicality of the stylus pen and further facilitates the users.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
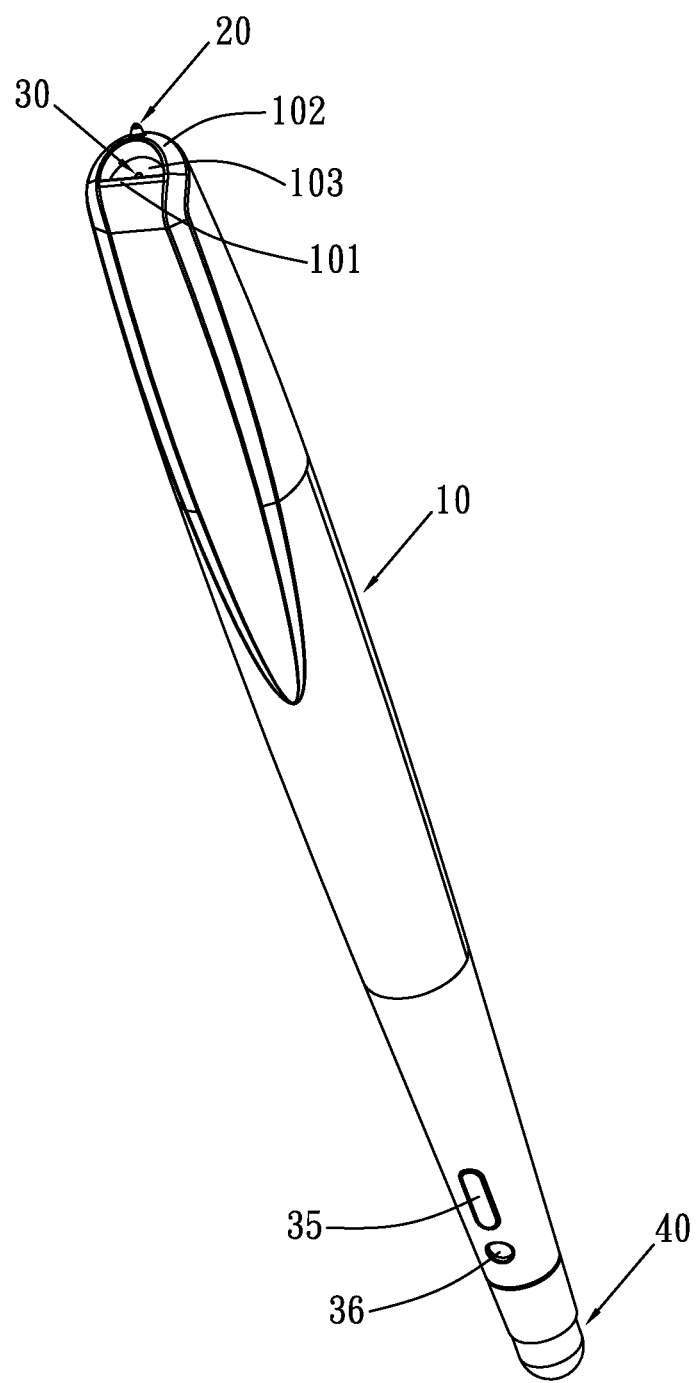
FIG. 1 is an assembled perspective view of a stylus pen according to the present invention.
Figure 2:
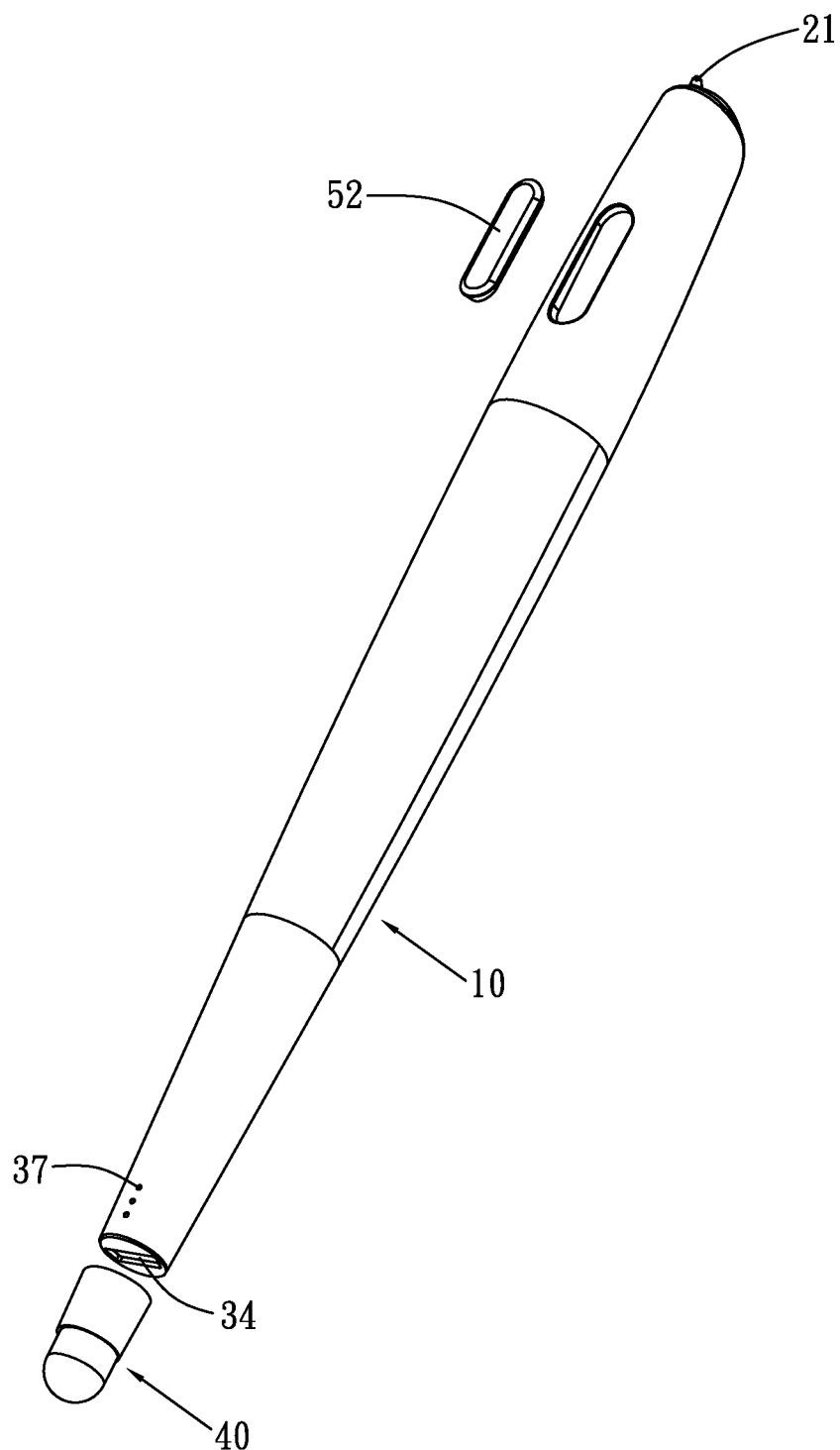
FIG. 2 is a partially exploded perspective view of the stylus pen of FIG. 1.
Figure 3:
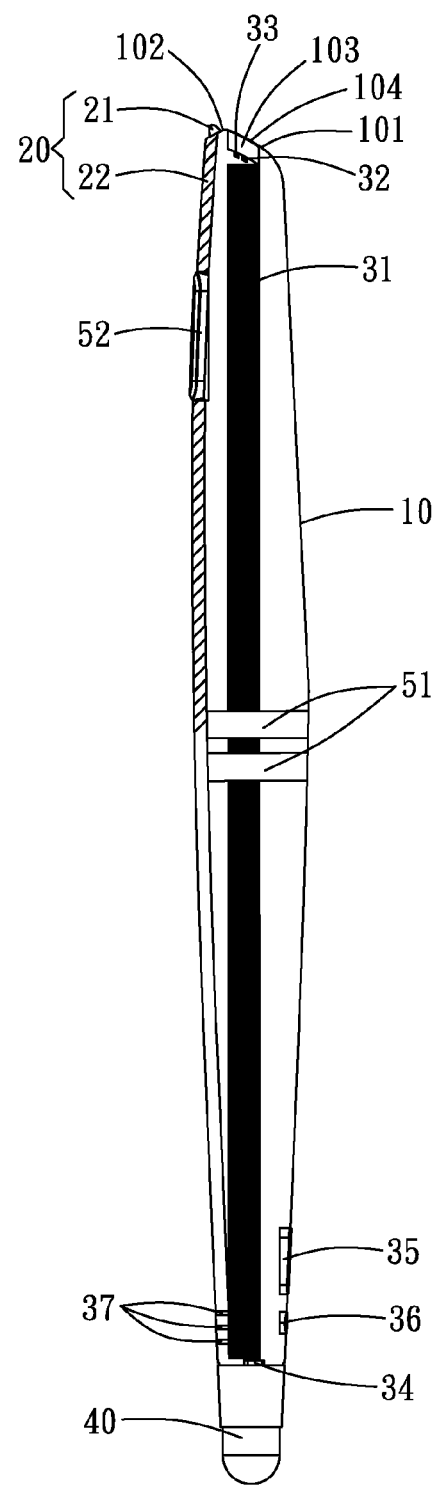
FIG. 3 is a sectional view of the stylus pen of FIG. 1.

With reference to FIG. 1, FIG. 2 and FIG. 3, a stylus pen in accordance with an embodiment of the present invention includes a hollow pen body 10, an electromagnetic touch pen module 20, a camera module 30, an additional function module 40, a rechargeable battery pack 51 and a function button 52.

A top end of the pen body 10 is concaved downward to form a cavity 103. A top of the cavity 103 is covered with a cover glass 104. The electromagnetic touch pen module 20 is used to realize an electromagnetic touch pen function, and includes an electromagnetic pen head 21 disposed in the top end of the pen body 10, and a first circuit board 22 mounted to an inner sidewall of the pen body 10. The first circuit board 22 electrically connects with the electromagnetic pen head 21 for controlling the electromagnetic pen head 21 to output corresponding electromagnetic signals.

The camera module 30 is used to realize a camera function, and includes a second circuit board 31, a camera lens 32 embedded in a bottom wall of the cavity 103 of the pen body 10, a USB connector 34 disposed in a bottom end of the pen body 10, and a power button 36 embedded in a lower position of an outer sidewall of the pen body 10. The second circuit board 31 is mounted in the pen body 10 and electrically connects with the camera lens 32, the USB connector 34 and the power button 36. The power button 36 controls work states of the camera module 30. Images taken by the camera module 30 are capable of being transmitted out by virtue of the USB connector 34.

The rechargeable battery pack 51 is disposed in the pen body 10 and connected with both the first circuit board 22 and the second circuit board 31 to supply power for the electromagnetic touch pen module 20 and the camera module 30. The rechargeable battery pack 51 is capable of being charged via the USB connector 34. The function button 52 is embedded in an upper position of the outer sidewall of the pen body 10 and electrically connected to the first circuit board 22 and the second circuit board 31.

In use, through powering on and off the power button 36, the stylus pen switches working modes between the camera module 30 and the electromagnetic touch pen module 20. Accordingly, when the stylus pen works by the camera module 30, the function button 52 is acted as a shutter button; when the stylus pen works by the electromagnetic touch pen module 20, the function button 52 is acted as a right mouse button. Because the working principles of the camera and the electromagnetic touch pen have been familiar by those skilled in the art, they are not respectively described in detail here.

Referring to FIG. 1 and FIG. 3 again, the top end of the pen body 10 defines a first inclined face 101 and a second inclined face 102 different from each other in angle and direction of inclination. The first inclined face 101 is an inclined plane passing through the axis of the pen body 10 and inclined downward to smoothly connect an outer surface of the pen body 10. The second inclined face 102 is cambered around the first inclined face 101 and inclined downward to connect the outer surface of the pen body 10. The first inclined face 101 is concaved downward to form the cavity 103 of which a bottom face is inclined and parallel to the first inclined face 101. The electromagnetic pen head 21 is perpendicularly disposed in the second inclined face 102. The camera module 30 further includes a flash light 33 embedded in the bottom wall of the cavity 103 of the pen body 10. The camera lens 32 and the flash light 33 are apart arranged along the inclination direction of the bottom face of the cavity 103, and the flash light 33 makes the light entering the cavity 103 uniformized so as to improve the definition of the images. The electromagnetic pen head 21 is located in the highest middle of the second inclined face 102, and in an axial vertical plane of the pen body 10 with the camera lens 32 and the flash light 33. In this embodiment, the flash light 33 is a LED flash light.

The camera module 30 further includes a wireless transmission unit which makes the images taken by the camera module 30 wirelessly transmitted out. In this embodiment, the wireless transmission unit acts by a Bluetooth transmission mode, and includes a Bluetooth module (not shown) positioned on the second circuit board 31 and a pairing button 35 embedded in the lower position of the outer sidewall of the pen body 10 and above the power button 36. The pairing button 35 is electrically connected with the Bluetooth module to switch the states of the Bluetooth transmission mode.

The camera module 30 further includes a plurality of indicator lights 37 embedded in the lower position of the outer sidewall of the pen body 10 opposite to the power button 36, and arranged at regular intervals from top to bottom. The indicator lights 37 are electrically connected with the second circuit board 31 to indicate states of the power button 36, electric quantity and charging condition of the rechargeable battery pack 51, and on/off states of the Bluetooth transmission mode, respectively.

Referring to FIG. 2 and FIG. 3 again, the additional function module 40 is removably assembled to the bottom end of the pen body 10, and could be a capacitive touch pen head, a resistive touch pen head or a ballpoint pen. In this embodiment, the additional function module 40 is a capacitive touch pen head. When needing to use the USB connector 34, it is just done that removing the additional function module 40 from the pen body 10.

As described above, the stylus pen of the present invention utilizes the foregoing components and the interrelation thereof to realize multiple functions, so that improves the practicality of the stylus pen and further facilitates the users.

What is claimed is:

1. A stylus pen, comprising:
a hollow pen body of which a top end is concaved downward to form a cavity, a top of the cavity being covered with a cover glass;
an electromagnetic touch pen module including an electromagnetic pen head which is disposed in the top end of the pen body, and a first circuit board which is mounted to an inner sidewall of the pen body, the first circuit board electrically connecting with the electromagnetic pen head for controlling the electromagnetic pen head to output corresponding electromagnetic signals;
a camera module including a second circuit board, a camera lens embedded in a bottom wall of the cavity of the pen body, a USB connector disposed in a bottom end of the pen body, and a power button embedded in a lower position of an outer sidewall of the pen body, the second circuit board being mounted in the pen body and electrically connecting with the camera lens, the USB connector and the power button, the power button controlling work states of the camera module, images taken by the camera module being capable of being transmitted out by virtue of the USB connector;
a rechargeable battery pack disposed in the pen body and connected with both the first circuit board and the second circuit board to supply power for the electromagnetic touch pen module and the camera module, the rechargeable battery pack being capable of being charged via the USB connector; and
a function button embedded in an upper position of the outer sidewall of the pen body and electrically connected to the first circuit board and the second circuit board,
wherein through powering on and off the power button, the stylus pen switches working modes between the camera module and the electromagnetic touch pen module, accordingly, when the stylus pen works by the camera module, the function button is acted as a shutter button, when the stylus pen works by the electromagnetic touch pen module, the function button is acted as a right mouse button.

2. The stylus pen as claimed in claim 1, wherein the top end of the pen body defines a first inclined face and a second inclined face different from each other in angle and direction of inclination, the first inclined face is an inclined plane passing through the axis of the pen body and inclined downward to smoothly connect an outer surface of the pen body, the second inclined face is cambered around the first inclined face and inclined downward to connect the outer surface of the pen body, the first inclined face is concaved downward to form the cavity of which a bottom face is inclined and parallel to the first inclined face, the electromagnetic pen head is perpendicularly disposed in the second inclined face.

3. The stylus pen as claimed in claim 2, wherein the camera module further includes a flash light embedded in the bottom wall of the cavity of the pen body, the camera lens and the flash light are apart arranged along the inclination direction of the bottom face of the cavity, the electromagnetic pen head is located in the highest middle of the second inclined face, and in an axial vertical plane of the pen body with the camera lens and the flash light.

4. The stylus pen as claimed in claim 1, wherein the camera module further includes a wireless transmission unit which makes the images taken by the camera module wirelessly transmitted out.

5. The stylus pen as claimed in claim 4, wherein the wireless transmission unit acts by a Bluetooth transmission mode, and includes a Bluetooth module positioned on the second circuit board and a pairing button embedded in the lower position of the outer sidewall of the pen body, the pairing button is electrically connected with the Bluetooth module to switch the states of the Bluetooth transmission mode.

6. The stylus pen as claimed in claim 5, wherein the camera module further includes an indicator light embedded in the lower position of the outer sidewall of the pen body, the indicator light is electrically connected with the second circuit board to indicate whether the Bluetooth transmission mode is on.

7. The stylus pen as claimed in claim 1, wherein the camera module further includes a plurality of indicator lights embedded in the lower position of the outer sidewall of the pen body and arranged at regular intervals from top to bottom, the indicator lights are electrically connected with the second circuit board to indicate states of the power button, electric quantity and charging condition of the rechargeable battery pack.

8. The stylus pen as claimed in claim 1, further comprising an additional function module which is removably assembled to the bottom end of the pen body.

9. The stylus pen as claimed in claim 8, wherein the additional function module is a capacitive touch pen head, a resistive touch pen head or a ballpoint pen.

* * * * *